US010689841B2

(12) United States Patent
Fugallo, III et al.

(10) Patent No.: US 10,689,841 B2
(45) Date of Patent: Jun. 23, 2020

(54) CONSTRUCTION ANCHORING SYSTEM, APPARATUS AND METHODOLOGY

(71) Applicant: Anchor Ring Solutions, LLC, Pen Argyl, PA (US)

(72) Inventors: Joseph A. Fugallo, III, East Meadow, NY (US); John P. Marra, Bangor, PA (US); James R. Walsh, Westport, CT (US); Joseph Fugallo, IV, East Meadow, NY (US)

(73) Assignee: Anchor Ring Solutions, LLC, Pen Argyl, PA (US)

( * ) Notice: Subject to any disclaimer, the term of this patent is extended or adjusted under 35 U.S.C. 154(b) by 0 days.

(21) Appl. No.: 16/186,247

(22) Filed: Nov. 9, 2018

(65) Prior Publication Data

US 2020/0149271 A1    May 14, 2020

(51) Int. Cl.
*E04B 1/41* (2006.01)
*F16B 37/00* (2006.01)
*F16B 35/06* (2006.01)

(52) U.S. Cl.
CPC ............ *E04B 1/4157* (2013.01); *F16B 35/06* (2013.01); *F16B 37/00* (2013.01)

(58) Field of Classification Search
CPC .... E04B 1/4114; E04B 1/4107; E04B 1/4157; E04B 9/18; E04G 21/185; F16B 13/124
See application file for complete search history.

(56) References Cited

U.S. PATENT DOCUMENTS

| 2,952,947 | A | * | 9/1960 | White | F16M 7/00 52/708 |
| 4,139,023 | A | * | 2/1979 | Turley | B65D 59/06 138/96 T |
| 4,739,596 | A | * | 4/1988 | Cunningham | E03C 1/042 248/56 |
| 4,932,818 | A | * | 6/1990 | Garwood | E04B 1/4157 411/107 |
| 5,497,592 | A | * | 3/1996 | Boeshart | E04B 2/8647 249/43 |
| 5,518,351 | A | * | 5/1996 | Peil | F16B 35/06 248/59 |
| 5,895,188 | A | * | 4/1999 | Cheng | F16B 37/0807 249/40 |
| 6,079,179 | A | * | 6/2000 | Shoemaker, Jr. | E04B 1/4164 411/396 |
| 6,250,044 | B1 | * | 6/2001 | Funk | A47K 10/10 211/105.2 |

(Continued)

*Primary Examiner* — Gisele D Ford
(74) *Attorney, Agent, or Firm* — Ryan, Mason & Lewis, LLP

(57) ABSTRACT

A construction anchoring system includes one or more anchor apparatuses which are mountable relative to a form used to create a concrete support structure. The concrete is deposited in the form and cures whereby the one or more anchor apparatuses becomes embedded within the concrete support structure. The embedded anchor apparatus is readily accessible to be coupled with, or to support, construction supplies or equipment such as ductwork, electrical cables, plumbing, sprinklers, safety lines or fences, etc. within a construction site. A plurality of anchor apparatuses may be mounted relative to the concrete form to create a system for organizing the installation of construction materials and/or safety equipment.

19 Claims, 11 Drawing Sheets

(56) References Cited

U.S. PATENT DOCUMENTS

| | | | |
|---|---|---|---|
| 6,718,710 B2* | 4/2004 | Platt | E04F 11/1814 |
| | | | 52/296 |
| 7,082,664 B2* | 8/2006 | Powers | F16B 5/0275 |
| | | | 29/525.01 |
| 7,124,547 B2* | 10/2006 | Bravinski | E02D 27/02 |
| | | | 52/426 |
| 7,621,080 B2* | 11/2009 | Stanfield | E04H 12/2292 |
| | | | 52/170 |
| 8,011,149 B2* | 9/2011 | Knudsen | E04H 12/2269 |
| | | | 52/298 |
| RE46,831 E * | 5/2018 | Francies, III | |
| 10,036,158 B2* | 7/2018 | Espinosa | E04B 1/4128 |
| 10,393,159 B2* | 8/2019 | Frost | F16B 5/0208 |
| 2011/0107699 A1* | 5/2011 | Kawai | E04B 1/24 |
| | | | 52/393 |
| 2013/0067849 A1* | 3/2013 | Espinosa | E04B 1/4121 |
| | | | 52/699 |
| 2014/0157717 A1* | 6/2014 | Espinosa | E04B 1/4114 |
| | | | 52/700 |
| 2017/0096816 A1* | 4/2017 | Keshet | F16B 5/0233 |
| 2017/0101771 A1* | 4/2017 | Espinosa | E02D 35/00 |
| 2018/0363291 A1* | 12/2018 | Espinosa | E04C 5/16 |
| 2019/0285105 A1* | 9/2019 | Wiley | F16B 13/124 |

\* cited by examiner

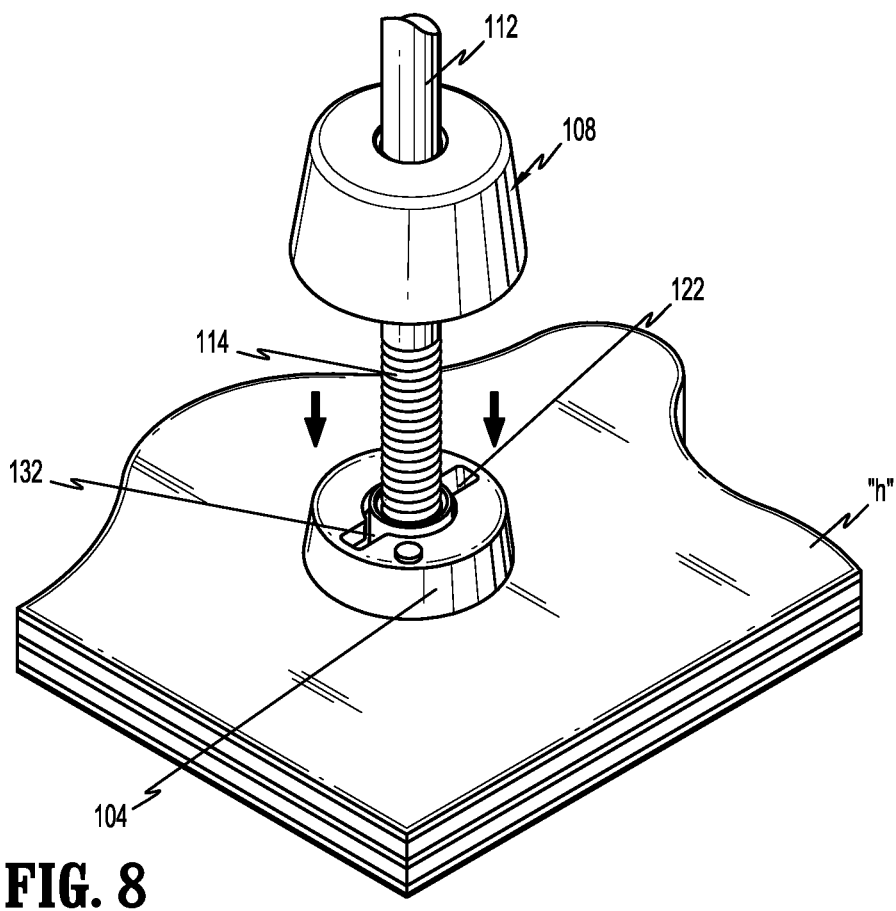
FIG. 8
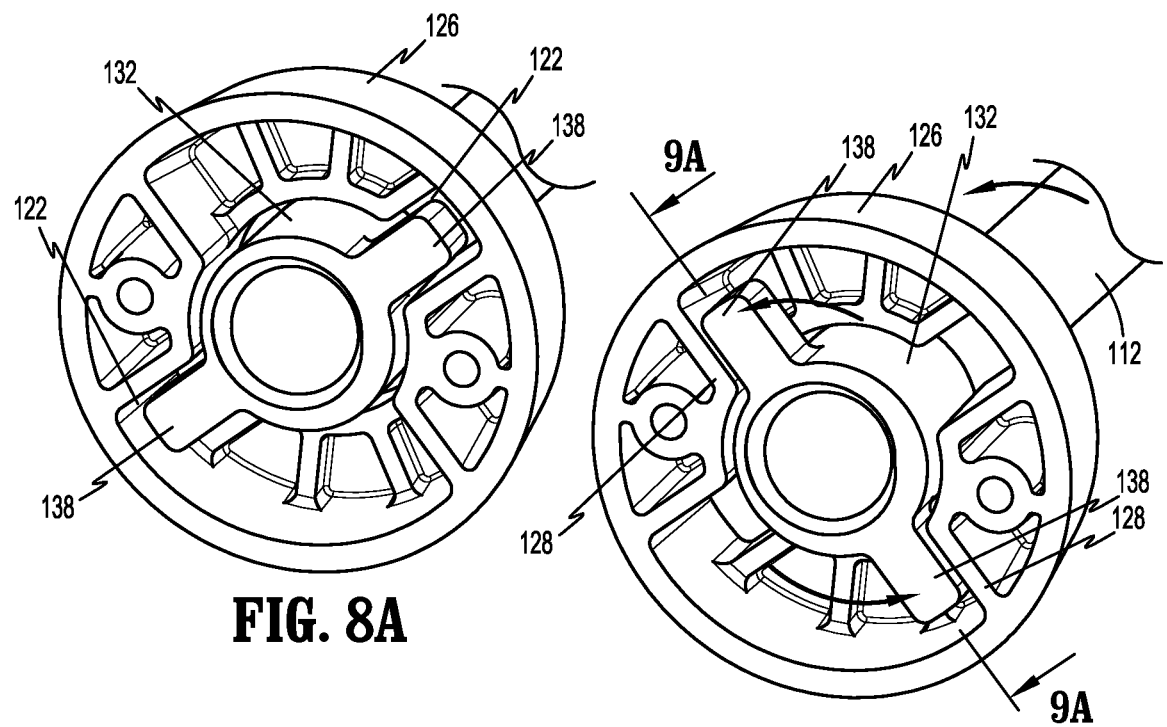
FIG. 8A
FIG. 9

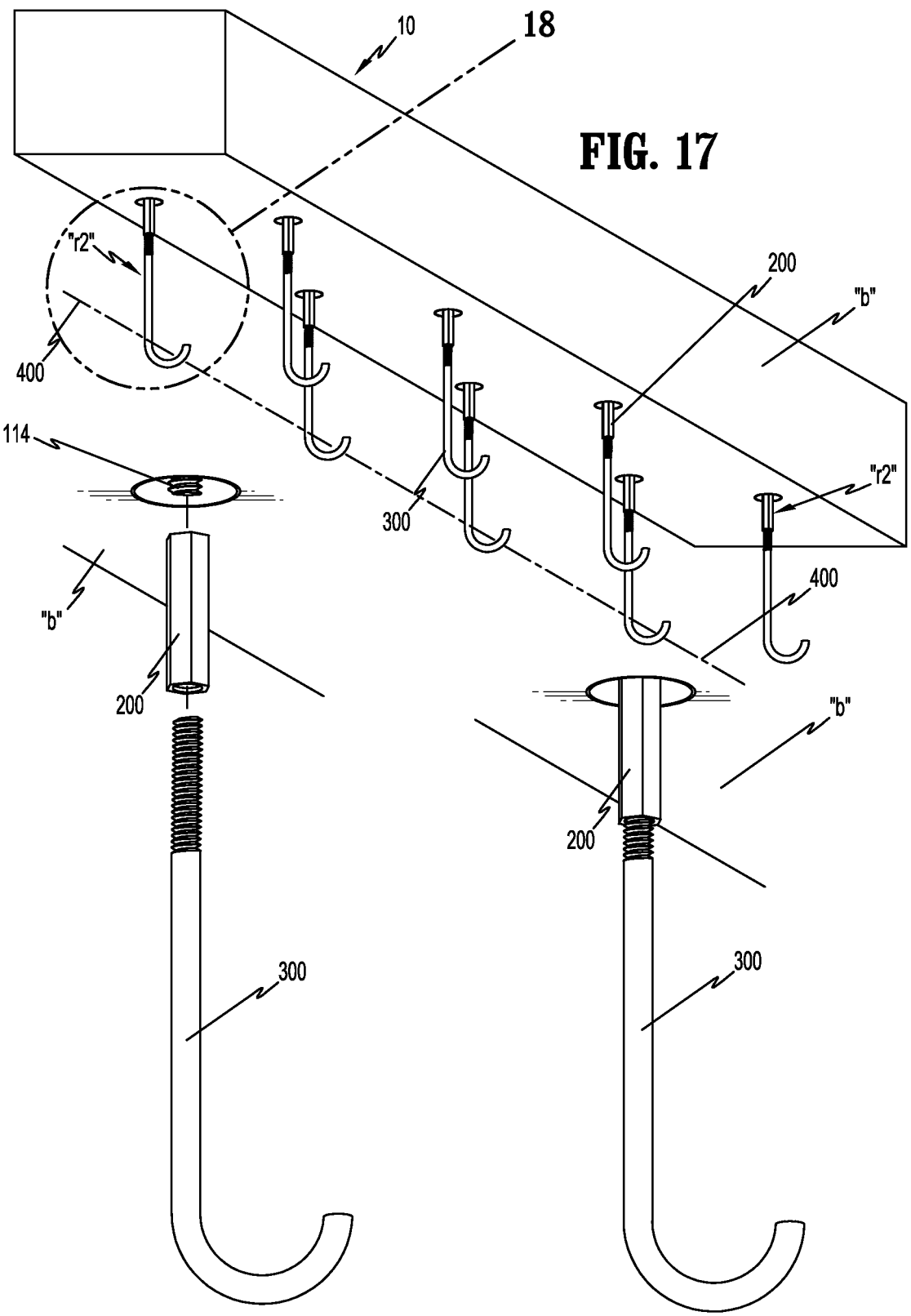

CONSTRUCTION ANCHORING SYSTEM, APPARATUS AND METHODOLOGY

BACKGROUND

1. Technical Field

The present disclosure relates to a construction anchoring system, and, in particular, relates to an anchoring system including one or more anchor apparatuses which are mountable relative to a form used to create a concrete support structure. The concrete is deposited in the form and cures whereby the one or more anchor apparatuses becomes embedded with the concrete support structure. The embedded anchor apparatus is readily accessible to be coupled with, or to support, construction supplies or equipment such as ductwork, electrical cables, plumbing, sprinklers, safety lines or fences, etc. within a construction site. A plurality of anchor apparatuses may be mounted relative to the concrete form to create a system for organizing the construction materials in a manner which facilitates all phases of construction, enhances efficiency and organization, and substantially reduces costs and work hours. Moreover, the anchoring system, apparatus, and methodology for implementation will substantially impact current commercial and residential construction practices which incorporate concrete support structures in the form of beams, flooring, ceilings, roofing, etc.

2. Background of Related Art

Currently, during construction of residential and/or commercial building structures, provisions are made to accommodate the various electrical, plumbing, sprinkler, ductwork supplies, etc. to be incorporated in the final completed unit. With construction involving concrete or concrete structural elements, contractors are usually required to drill into the cured concrete to embed a fastener, hook, rod or the like to couple and run, e.g., electrical lines along a horizontal beam, vertical beam or a ceiling. Embedding a fastener or hook within cured concrete is an arduous and time-consuming process, and may affect the structural integrity of the concrete and/or structure. In addition, multiple contractors, e.g., electricians, plumbers, HVAC personnel, may require access to the beam structures for installation of additional fasteners, bolts, etc. which not only may further potentially affect the integrity of the concrete, but also presents logistical issues for the various contractors who need access to the support structure before the finishing work is performed at the site.

SUMMARY

Accordingly, the present disclosure is directed to a novel system, apparatus and methodology to assist contractors in residential and commercial construction. The system and associated methodology will substantially impact the current construction industry. More specifically, the system and methodology employ one or more anchor apparatuses which are positioned within the form used to create the support structure before, e.g., depositing the concrete within the form. Upon curing of the concrete support structure, the form is removed and the anchor apparatuses, which are now embedded in the support structure, are readily exposed to be utilized in a plurality of ways, including, but not limited to, supporting electrical lines, plumbing, sprinklers, ductwork, safety straps, safety nets etc. A number of anchor apparatuses may be positioned within the form to accommodate the contractor's needs, and may be strategically positioned within the forms prior to pouring concrete to assist the contractor in organizing the layout of the particular equipment or supplies. Each anchor apparatus may be coupled through, e.g., an additional coupling, to an unlimited number of construction materials with relative ease to "run", e.g., the electrical, plumbing or safety equipment (e.g., safety straps, hooks, perimeter cable systems) as desired. Each contractor, e.g., an electrician or a plumber, may install their own system of anchor apparatuses on a single concrete form without any risk of interference with the other contractors.

In one exemplary embodiment, an anchoring system for installation within support structure includes at least one anchoring apparatus having a locking plate configured for securement relative to a form board a form board used to form the concrete support, an elongate anchor with a connector segment at one end for connecting with a construction tool, a coupler mounted to the elongate anchor and a cover mounted about the elongate anchor and movable for positioning over the coupler and the locking plate. The coupler is manipulable to be coupled to the locking plate to at least partially secure the elongate anchor to the locking plate. The coupler defines a central opening configured to at least partially receive the connector segment of the elongate anchor, and wherein the coupler and the connecting segment include cooperating structure to releasably secure the coupler and the elongate anchor. In embodiments, the coupler defines an internal thread at least partially circumscribing the opening and wherein the connector segment of the anchor includes an external thread configured to threadably engage with the internal thread of the couple to releasably secure the coupler and the elongate anchor.

The locking plate and the coupler include cooperating structure configured to secure the coupler to the locking plate. The locking plate may define a plate aperture and at least one keyed slot adjacent the plate aperture. The coupler includes a central segment defining the coupler opening and at least one wing depending from the central segment. The central segment and the at least one wing are respectively receivable within the plate aperture and the at least one keyed slots of the locking plate when in a first rotational orientation of the coupler and the locking plate, whereby relative rotational movement of the coupler and the locking plate to a second rotational orientation thereof at least partially secures the coupler to the locking plate. The locking plate may define two opposed keyed slots and wherein the coupler includes two opposed wings correspondingly dimensioned to be received within the two opposed keyed slots when in the first rotational orientation of the coupler and the locking plate.

The cover defines a cover passage for reception of the connector segment of the elongate anchor. In embodiments, the cover defines an inner thread circumscribing the cover passage with the inner thread configured to cooperate with the threaded segment of the elongate anchor to advance the cover relative to the elongate anchor.

The locking plate includes at least one fastener opening configured to receive a fastener for securing the locking plate to the form board.

The system may include a plurality of anchor apparatuses.

In one exemplary embodiment, a method of construction is disclosed. The method includes anchoring at least one anchor apparatus to a form utilized to create a concrete support structure, by:

securing a locking plate of the at least one anchor apparatus to a board of the form;

coupling an elongate anchor of the at least one anchor apparatus to the locking plate, the elongate anchor including an external thread;

advancing a cover of the at least one anchor apparatus along the elongate anchor for positioning against the board;

depositing concrete within the form to create the concrete support structure whereby the cover isolates at least a portion of the external thread of the elongate anchor from the concrete; and removing the board to at least partially expose the cover and the at least the portion of the external thread of the elongate anchor.

Depositing concrete may include establishing an isolated internal cavity within the cover with the at least the portion of the external thread of the anchor extending within the internal cavity. Coupling the elongate anchor may include mounting a coupler of the at least one anchor apparatus about the external thread of the elongate anchor and connecting the coupler to the locking plate. In embodiments, the coupler includes an internal thread and wherein mounting the coupler includes threadably engaging the coupler with the external thread of the anchor. In certain embodiments, the locking plate defines a plate aperture and at least one keyed slot adjacent the plate aperture and the coupler includes a central segment defining the coupler opening and at least one wing depending from the central segment, where the method further includes positioning the central segment and the at least one wing respectively within the plate aperture and the at least one keyed slot of the locking plate and rotating the coupler to secure the coupler and the anchor relative to the locking plate.

The cover may define a cover passage with an internal thread and wherein advancing the cover includes threadably coupling the internal thread of the cover with the external thread of the elongate anchor.

The method may further includes attaching a tool relative to the at least a portion of the external thread of the anchor subsequent to removing the board. The tool may include a threaded segment and wherein attaching the tool includes threadably coupling the tool with the portion of the external thread of the anchor. The method may further include supporting construction equipment, materials, supplies, safety hooks, perimeter fall cables with the tool.

Other advantages of the construction anchoring system will be appreciated from the following description.

BRIEF DESCRIPTION OF THE DRAWINGS

Various aspects and features of the present disclosure are described hereinbelow with references to the drawings, wherein:

FIG. 8 is a perspective view illustrating the coupler mounted within the locking plate in accordance with one exemplary methodology of use of the system;

FIG. 8A is a perspective view illustrating the central segment and the wings of the coupler received within the plate aperture and the keyed slots of the plate segment of the locking plate in accordance with one exemplary methodology of use of the system;

FIG. 9 is a view similar to the view of FIG. 8A illustrating the coupler rotated within the locking plate to secure the wings beneath the locking plate thereby securing the coupler to the locking plate in accordance with one exemplary methodology of use of the system;

FIG. 16 is a perspective view illustrating the coupling tool and support hook being secured to one elongate anchor in accordance with one exemplary methodology of use of the system;

FIG. 17 is a perspective view illustrating a plurality of anchor apparatuses of the system within the concrete structure and further illustrating a coupling tool and a support hook mounted to each elongate anchor in accordance with one exemplary methodology of use of the system; and FIG. 18 is an enlarged view of the area of isolation depicted in FIG. 17 illustrating the coupling tool and the support hook secured to a single elongate anchor of the anchor apparatus in accordance with one exemplary methodology of use of the system.

DETAILED DESCRIPTION

Particular embodiments of the present disclosure are described hereinbelow with reference to the accompanying drawings. However, it is to be understood that the disclosed embodiments are merely examples of the disclosure and may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to employ the present disclosure in virtually any appropriately detailed structure.

Figure 1:
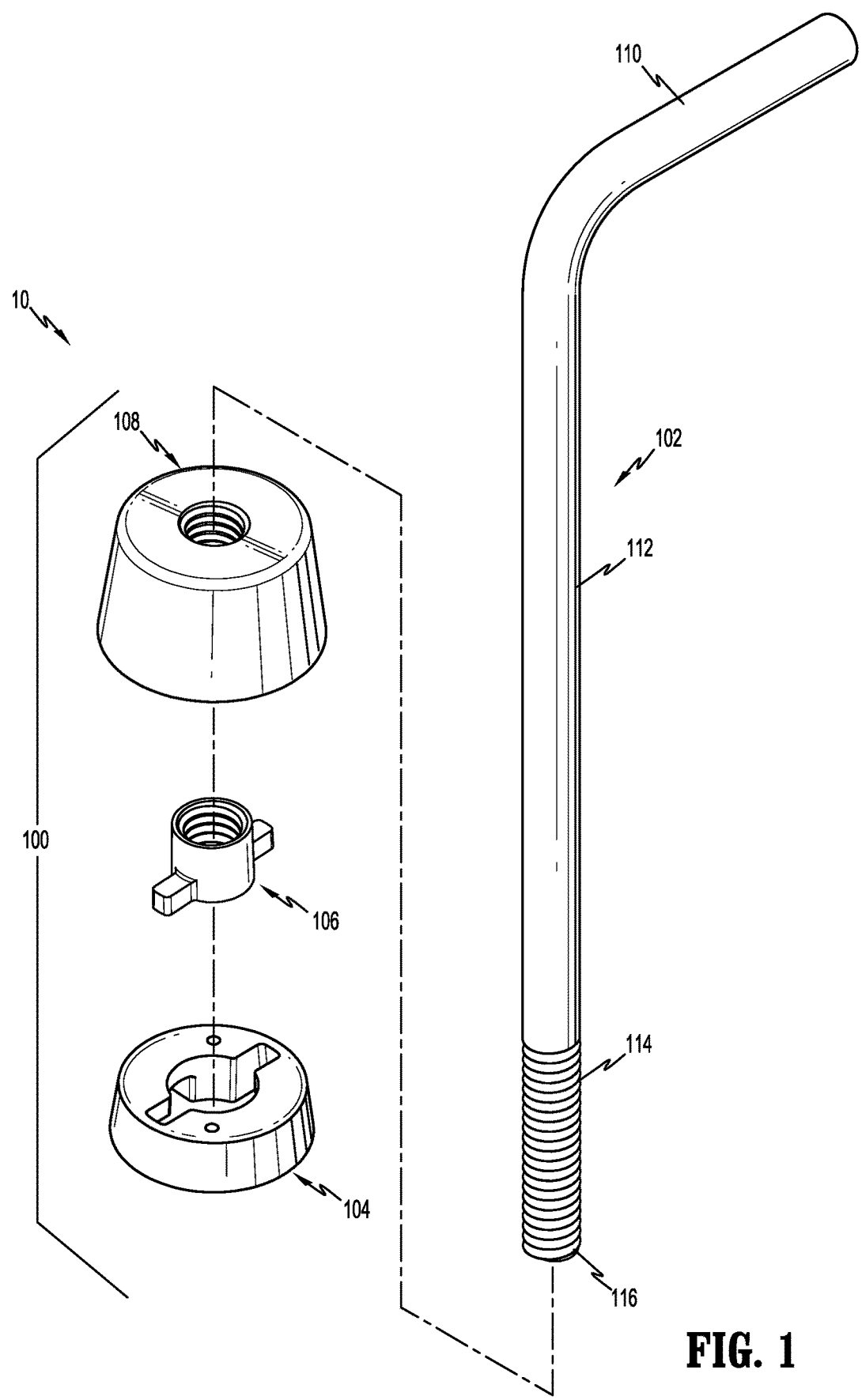
FIG. 1 is an exploded perspective view of the construction anchoring system in accordance with the principles of the present disclosure illustrating one anchor apparatus including an elongate anchor, a cover, a coupler and a locking plate.
Figure 2:
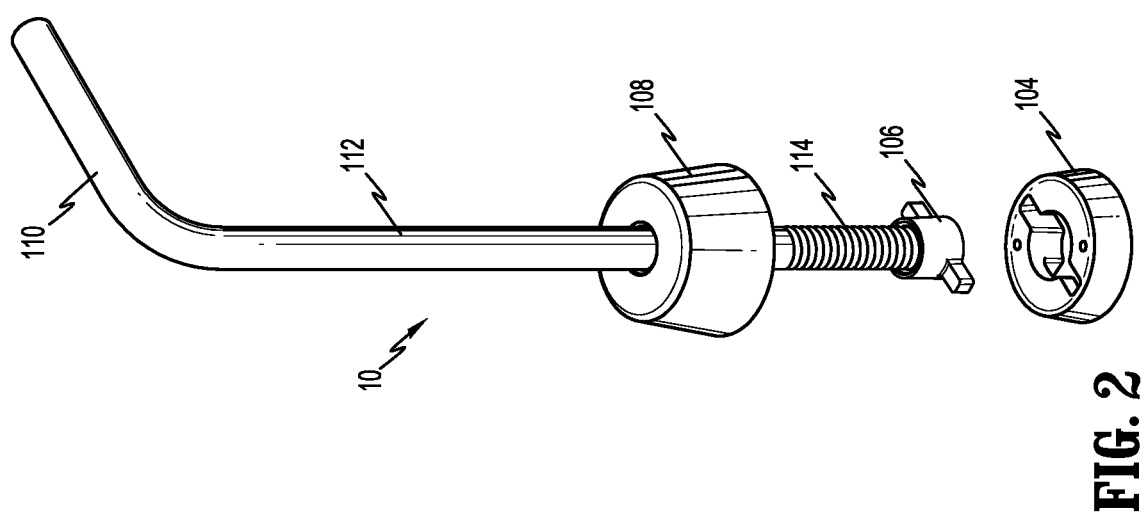
FIG. 2 is a perspective view illustrating the cover and the coupler mounted relative to the elongate anchor with the locking plate separated from the other components.

Referring now to FIG. 1, there is illustrated an exploded perspective view of one construction anchor apparatus 100 of the anchoring system 10 in accordance with the principles of the present disclosure. The anchoring system 10 includes one or more, e.g., a plurality of anchor apparatuses 100, depending on the needs of construction personnel. Each anchor apparatus 100 includes four components, namely, an anchor 102, a locking plate 104, a coupler 106 and a cover 108. The anchor 102 may take a variety of shapes or configurations. In one embodiment, the anchor 102 is monolithically formed including a L-shaped rod, e.g., having a handle 110 and an elongate anchor rod 112 depending from the handle 110. The elongate anchor rod 112 includes a connector segment, e.g., in the form of an external thread 114 extending to the end 116 of the elongate anchor rod 112 remote from the handle 110. As best depicted in FIG. 2, when assembled, the elongate anchor rod 112 is positionable within the cover 108 and has the coupler 106 disposed on the external thread 114 adjacent the remote end 116. The mounted coupler 106 is thereafter introduced and secured within the locking plate 104 as will be discussed in greater detail hereinbelow.

Figure 3A:
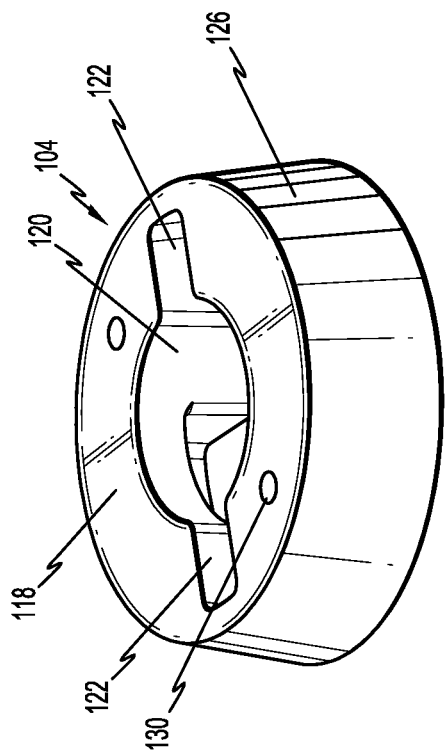
FIGS. 3A, 3B and 3C are perspective, top plan and bottom plan views, respectively, of the locking plate.
Figure 3B:
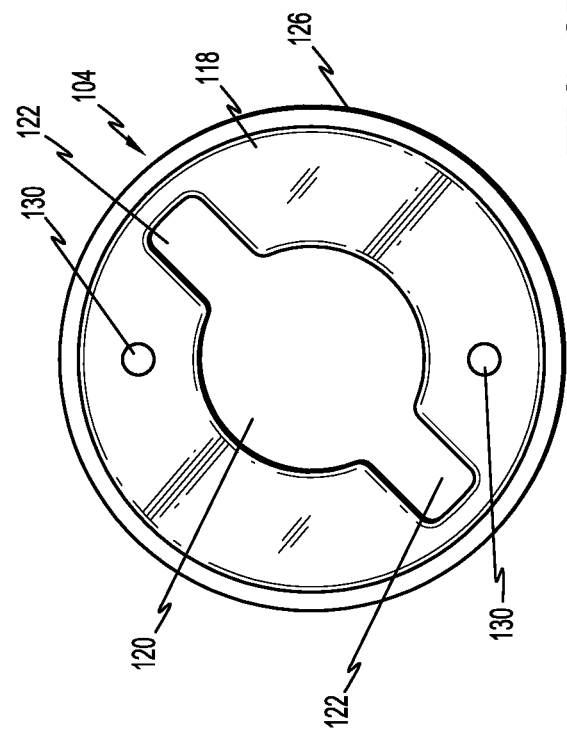
Figure 3C:
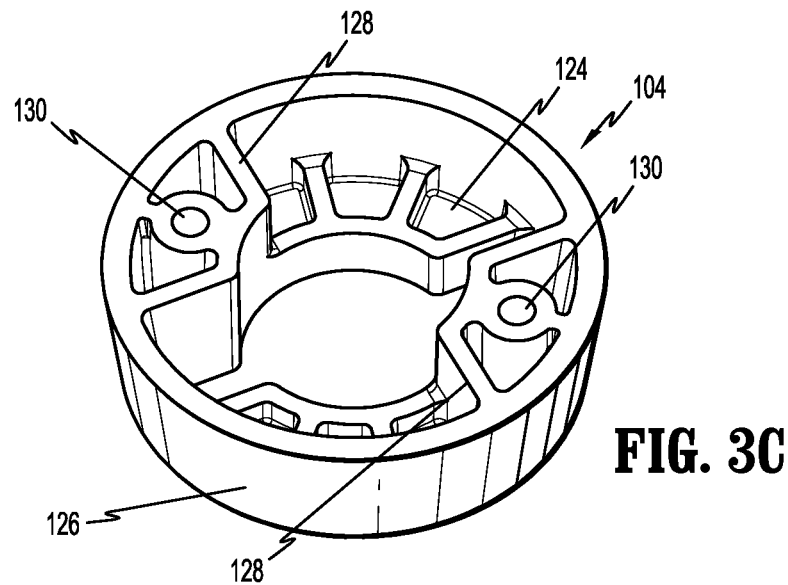

Referring now to FIGS. 3A-3C, in conjunction with FIGS. 1-2, the locking plate 104 will be discussed. The locking plate 104 may assume a variety of shapes or configurations. Although referred to as a "plate", the locking plate 104 does not necessarily require a plate like appearance, but could be any three-dimensional unit including a box, a dome, a bowl etc. The locking plate 104 defines a plate segment 118 having a central plate aperture 120 and at least one keyed slot 122, e.g., two diametrically opposed keyed slots 122, each communicating with the central plate aperture 120. As best depicted in FIG. 3C, the locking plate 104 defines an interior space 124 at least partially confined within the outer wall 126 or boundary of the locking plate 104 beneath the plate segment 118. The outer wall 126 may be tapered as shown. Opposed vertical walls or stops 128 at least partially define the interior space 124. The vertical stops 128 limit rotational movement of the coupler 106 within the locking plate 104. At least one fastener opening 130, e.g., two fastener openings 130, extend(s) through the locking plate 104 for reception of a fastener such as a screw or nail utilized to secure the locking plate 104 relative to a form board of a concrete or concrete form.

Figures 4A, 4B:
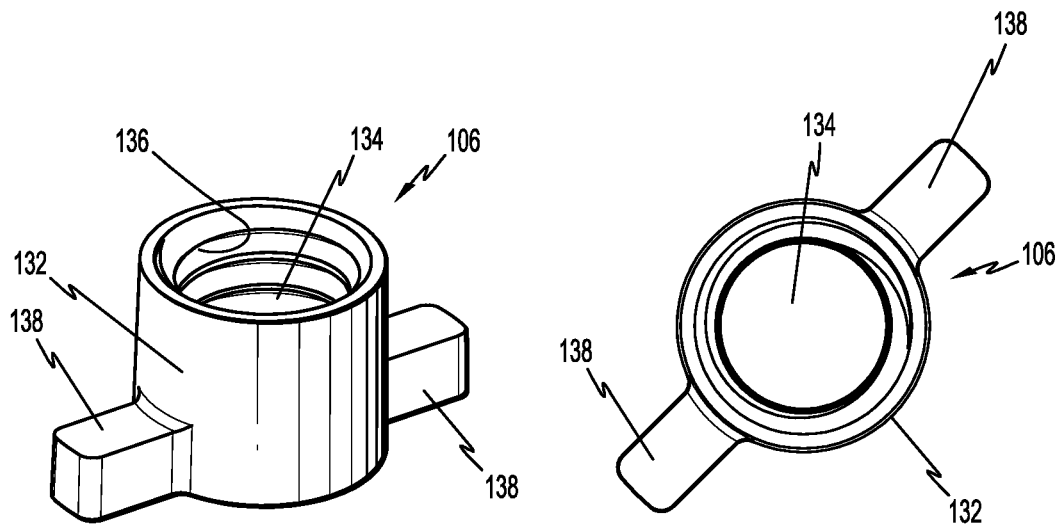
FIGS. 4A and 4B are perspective and top plan views, respectively, of the coupler.

Referring now to FIGS. 4A-4B, in conjunction with FIGS. 1-2, the coupler 106 includes a central coupler segment 132 defining a coupler opening 134 and an internal coupler thread 136 circumscribing the coupler opening 134. The internal coupler thread 136 of the coupler 106 threadably engages the external thread 114 of the elongate anchor rod 112 to mount the coupler 106 to the anchor 102. The coupler 106 further includes at least one, e.g., two, diametrically opposed wings 138 depending from the central coupler segment 132. The central coupler segment 132 and the wings 138 are cooperatively dimensioned to be respectively received within the central plate aperture 120 and the keyed slots 122 of the locking plate 104.

Figure 5A:
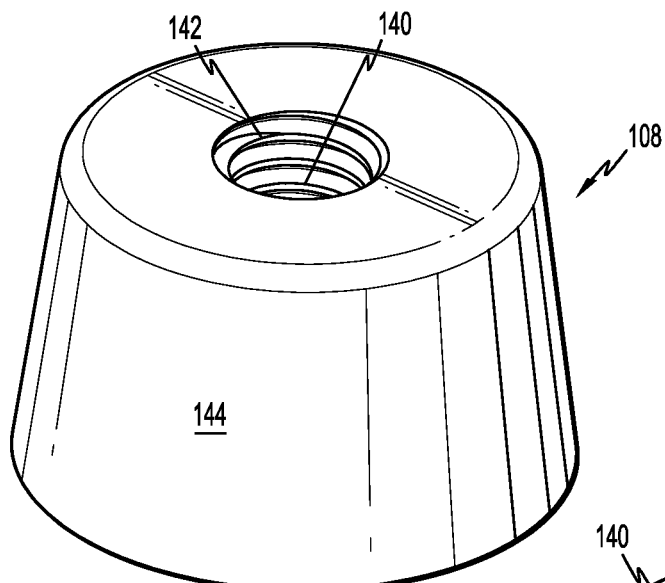
FIGS. 5A, 5B and 5C are top perspective, bottom plan and bottom perspective views, respectively, of the cover.
Figure 5B:
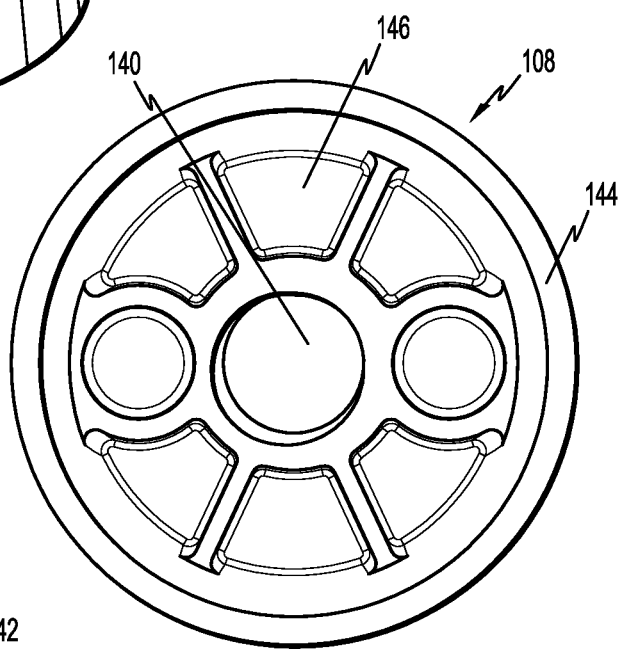
Figure 5C:
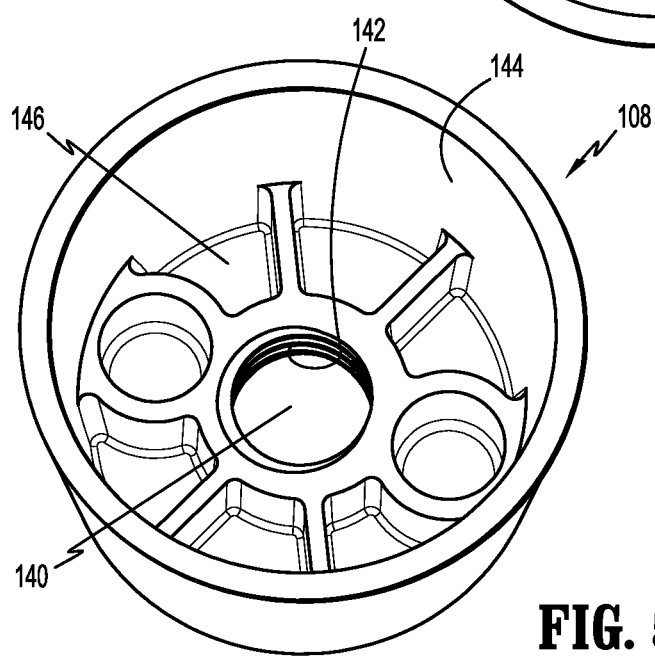

With reference to FIGS. 5A-5C, the cover 108 will be discussed. The cover 108 may be in the shape of a frustum; however, other shapes are also envisioned. The cover 108 includes a central cover passage 140 for reception and passage of the elongate anchor rod 112 of the anchor 102. The cover 108 further defines an internal cover thread 142 for threadably engaging the external thread 114 of the anchor 102. The cover 108 includes an outer cover wall 144 defining an internal cavity 146 dimensioned for positioning over the locking plate 104 and the coupler 106. The cover 108 may include supports in the form of internal ribs 148 or the like to increase the stability of the cover 108. The outer cover wall 144 of the cover 108 is dimensioned to form a tight tolerance relative to the outer wall 126 of the locking plate 104 to establish a fluid tight fit or seal with the outer wall 126 of the locking plate 104—the significance of which will be discussed in greater detail hereinbelow. In embodiments, the outer wall 126 of the locking plate 104 and the outer cover wall 144 of the cover 108 have similar tapered arrangements.

Each of the components of the anchor apparatus 100 may be formed of a suitable rigid polymeric material or a metallic material. In embodiments, at least the anchor 102 is formed of a suitable metal such as stainless steel or the like. At least the cover 108 may be made in a variety of colors, e.g., color-coded, to correspond to the tradesman or construction personnel who intend to use the particular anchor apparatus 100. More specifically, a particular color may be associated with specific construction personnel to assist said personnel in identifying the anchor apparatuses 100 which will be associated with his/her equipment.

As previously addressed, the anchoring system 10 is intended for use with cement or concrete support structures in connection with residential or commercial building construction. The anchoring system 10 may be embedded within horizontal or vertical beams, flooring or ceilings. The following discussion will focus on use of the anchoring system 10 in its application with a horizontal beam constructed during a phase of a construction. However, it is appreciated that the anchoring system 10 has many applications inclusive of those mentioned above and in many other applications.

Figure 6:
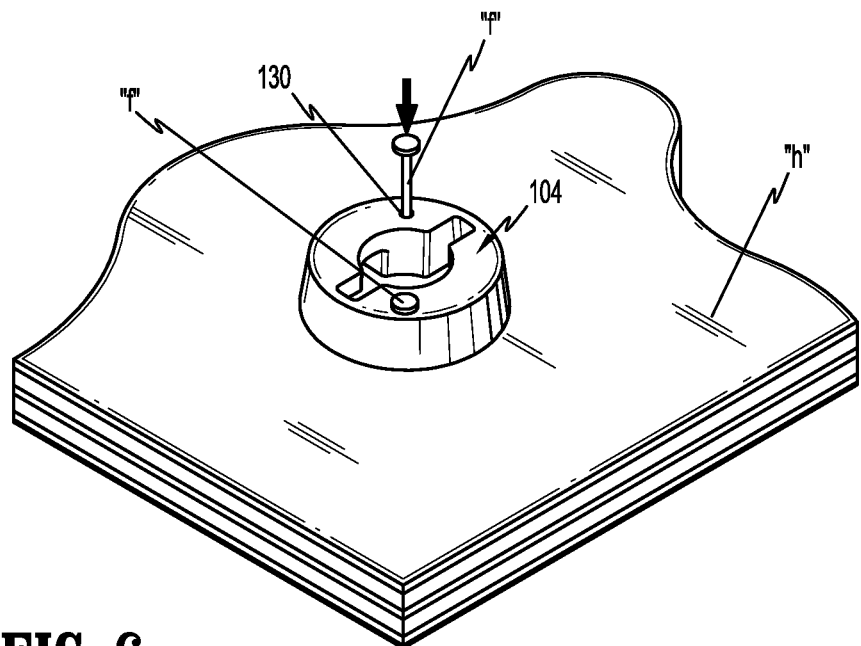
FIG. 6 is a perspective view illustrating securing of the locking plate to a form board of a concrete form in accordance with one exemplary use of the system of FIGS. 1-5C.
Figure 7:
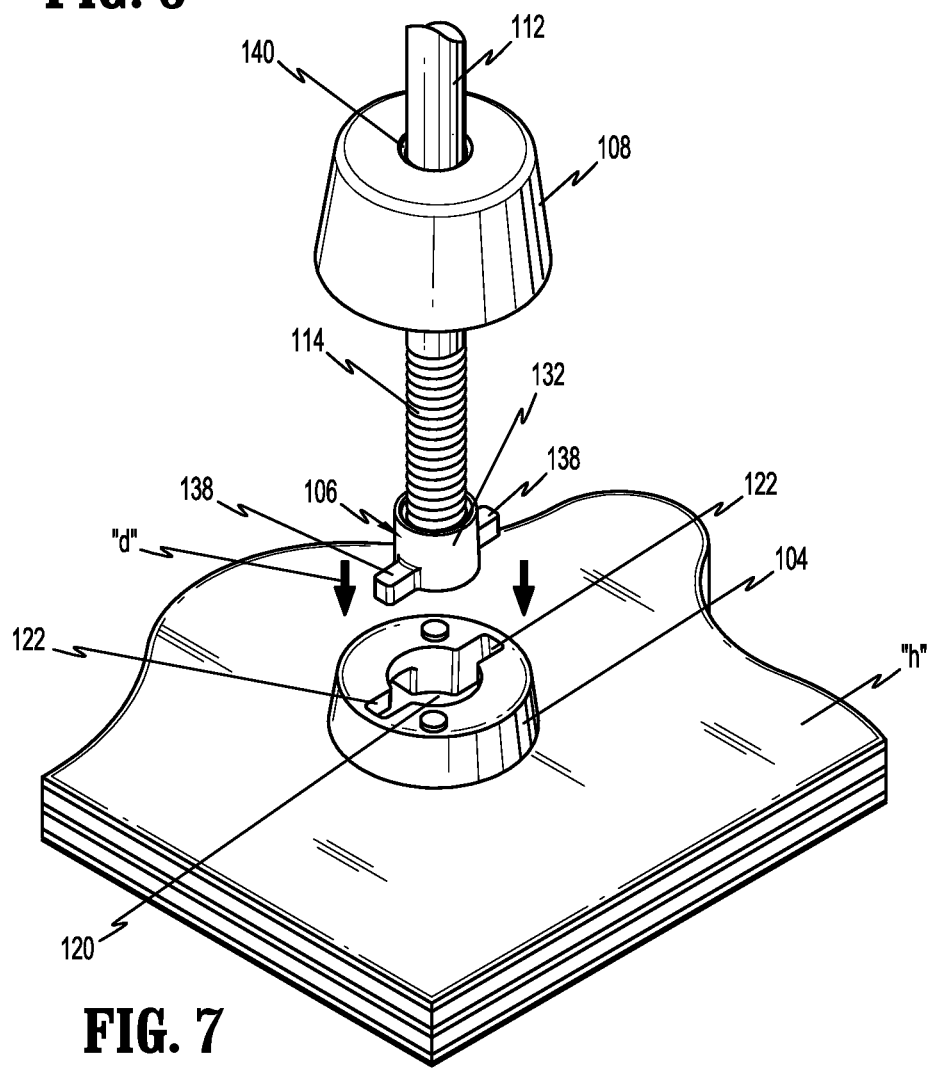
FIG. 7 is a perspective view illustrating the elongate anchor with mounted coupler being introduced within the locking plate in accordance with one exemplary methodology of use of the system.

During formation of a horizontal beam, a form for the concrete beam is constructed with the use of, e.g., plywood, or any other suitable materials. Generally, the form includes a lower horizontal form board and two vertical form boards depending upwardly from the horizontal form board. With reference to FIG. 6, only the horizontal form board "h" is shown for illustrative purposes. In accordance with one exemplary methodology of use of the anchoring system of the present disclosure, the locking plate 104 is secured to the inside surface of the horizontal form board "h". i.e., the surface which will be in contact with and support the poured concrete. The locking plate 104 is secured to the horizontal form board "h" with the use of nails, fasteners or screws "f" which are introduced within the fastener openings 130 of the locking plate 104 and secured to the horizontal form board "h" as depicted in FIG. 6. With reference to FIG. 7, the coupler 106 is threaded onto the remote end 116 of the anchor rod 112 and the cover passage 140 of the cover 108 is positioned over the handle 110 of the anchor 102 and slid down the anchor rod 112 as shown. The anchor 102 and the coupler 106 are advanced toward the locking plate 104 as shown by the directional arrows "d" in FIG. 7.

With reference now to FIGS. 7, 8 and 8A, the coupler 106 is introduced within the plate segment 118 of the locking plate 104 by aligning the central coupler segment 132 and the coupler wings 138 with the central plate aperture 120 and keyed slots 122 respectively of the plate segment 118 of the locking plate 104 corresponding to a first relative rotational orientation of the coupler 106 and the locking plate 104. FIG. 8A illustrates the central coupler segment 132 and the wings 138 received within the central plate aperture 120 and the keyed slots 122, and disposed within the interior space 124 of the locking plate 104 beneath the plate segment 118. Thereafter, with reference to FIG. 9, the coupler 106 is rotated through a predetermined angular sector of rotation via rotation of the handle 110 of the anchor 102 in the direction of directional arrows "r" to a second relative rotational orientation of the coupler 106 and the locking plate 104 whereby the wings 138 of the coupler 106 are displaced from the keyed slots 122 and are disposed beneath the plate segment 118 of the locking plate 104 engaging the vertical stops 128 within the interior space 124 of the locking plate 104 thereby coupling the coupler 106 and the anchor 102 to the locking plate 104.

Figure 10:
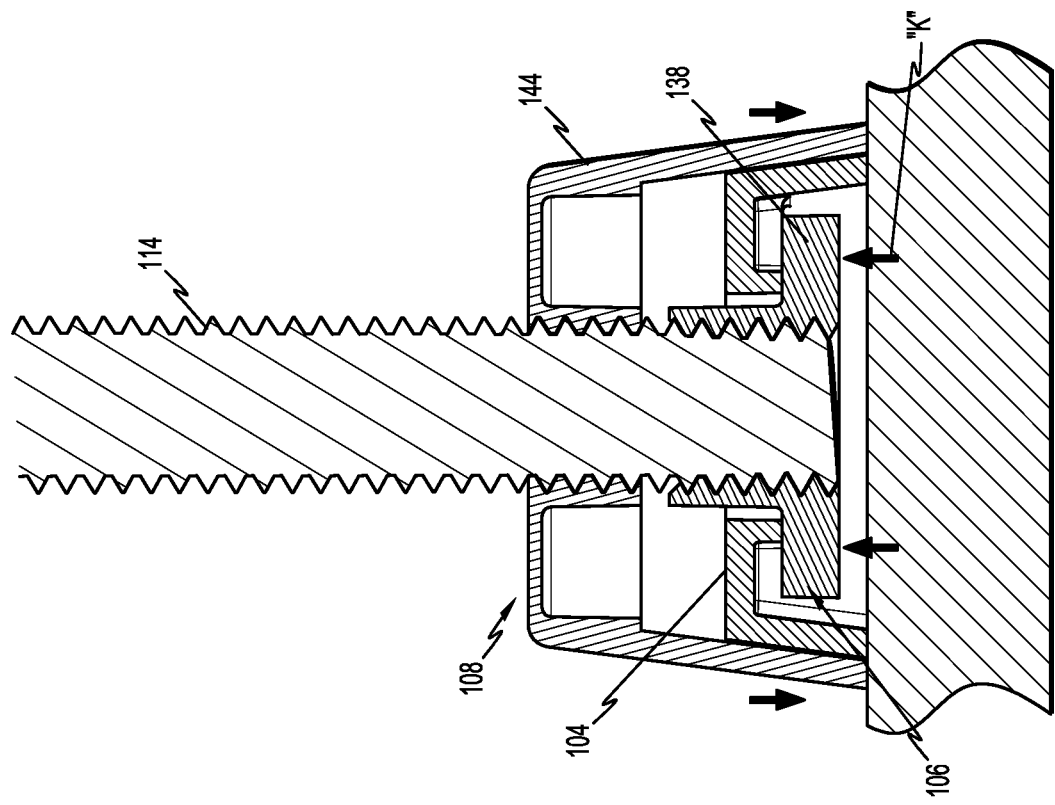
FIG. 10 is a cross-sectional view illustrating the cover secured against the locking plate through rotation of the cover about the elongate anchor in accordance with one exemplary methodology of use of the system.
Figure 9A:
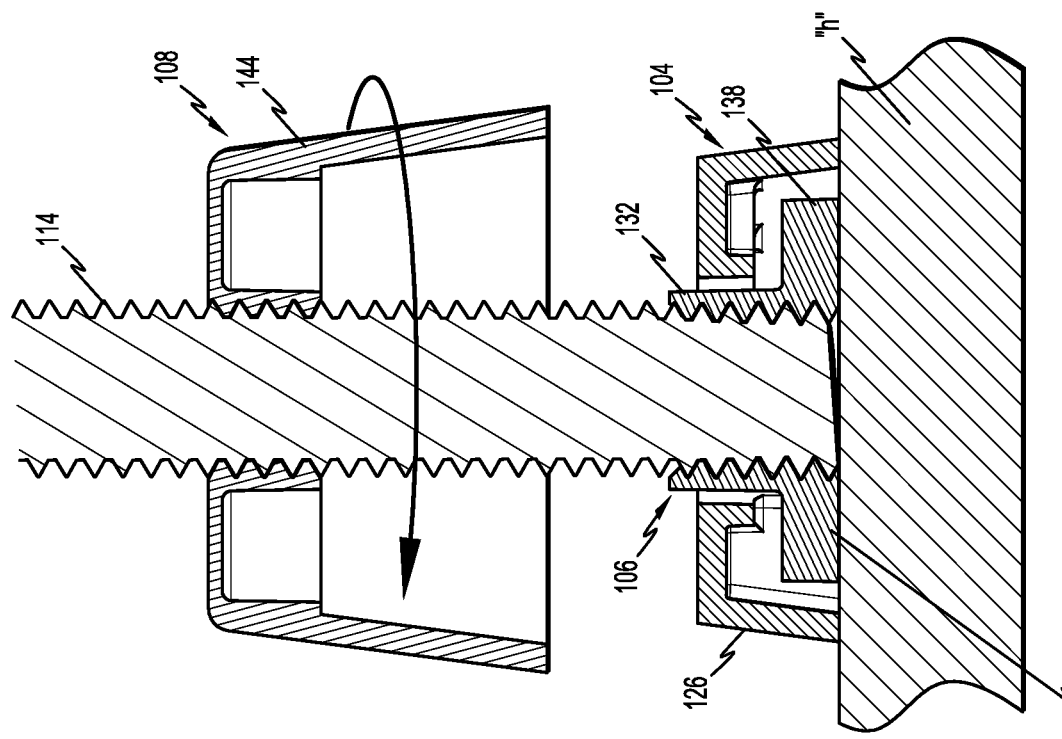
FIG. 9A is a cross-sectional view taken along the lines 9A-9A of FIG. 9 illustrating the coupler secured relative to the locking plate and the cover being advanced along the elongate anchor in accordance with one exemplary methodology of use of the system.

With reference now to FIGS. 9A-10, the cover 108 is threaded along the external thread 114 (through the threaded engagement of the internal cover thread 142 and the external thread 114 of the anchor rod 112) until it engages the horizontal form board "h" as depicted in FIG. 10. During advancement of the cover 108, the anchor 102 and the coupler 106 may also retract (in the direction of directional arrows "k") relative to the locking plate 104 whereby the wings 138 of the coupler engage the downwardly depending wall defining the central plate aperture 120 to further secure or lock the coupler 106, and thus, tihe anchor 102 relative to the locking plate 10.

Figure 11:
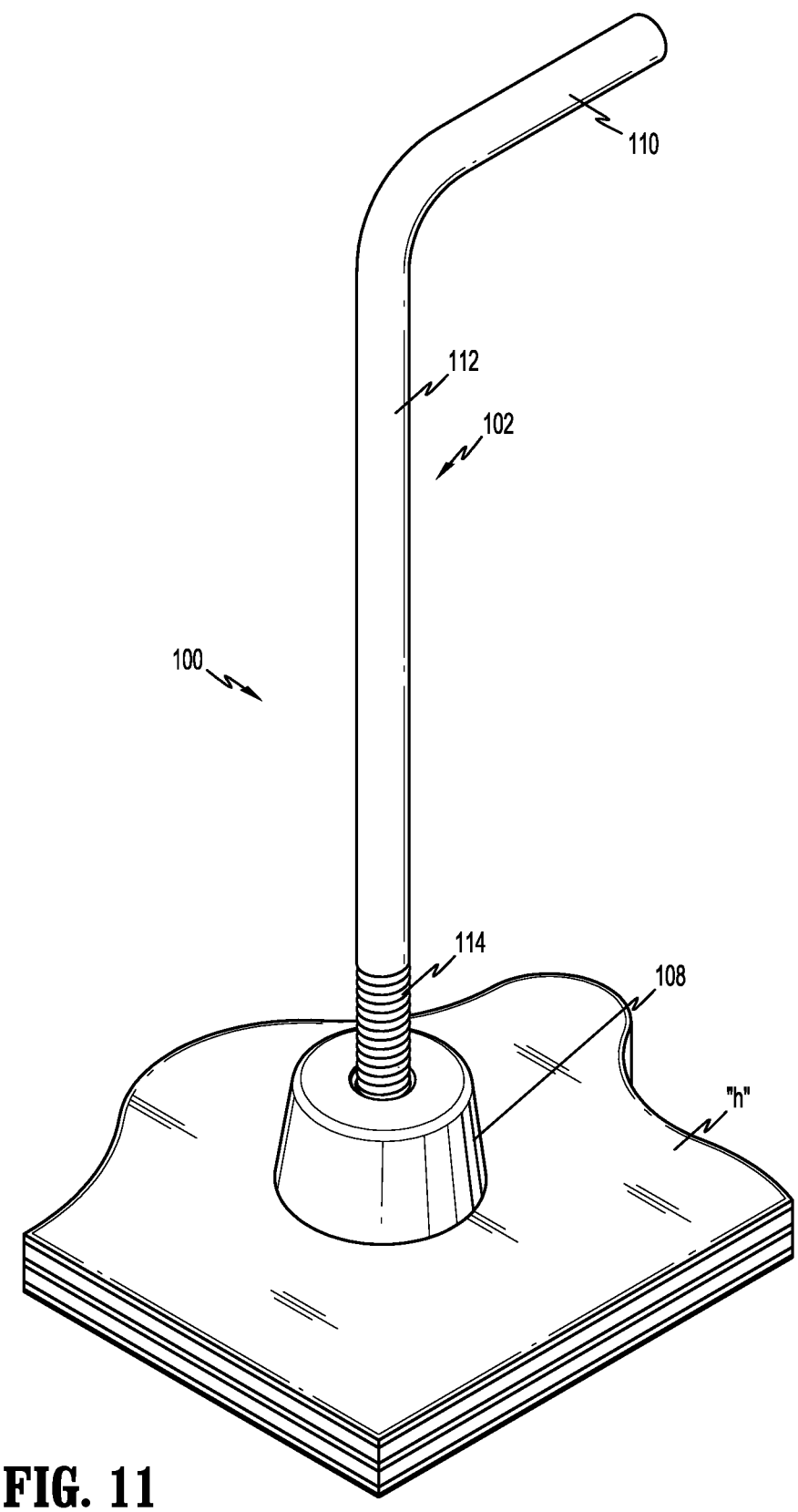
FIG. 11 is a view illustrating the anchor apparatus of the system secured to the form board of the concrete form in accordance with one exemplary methodology of use of the system.

As further depicted in FIG. 10, the outer cover wall 144 of the cover 108 fits precisely over the outer wall 126 of the locking plate 104. i.e., with a tight tolerance, and in embodiments, establishes a substantial fluid tight seal with the outer wall 126 of the locking plate 104. This will minimize or prevent any concrete from entering within the internal cavity 146 of the cover 108 when the concrete is poured and during curing of the concrete. FIG. 11 illustrates the anchor apparatus 100 mounted relative to the horizontal form board "h".

Figure 12:
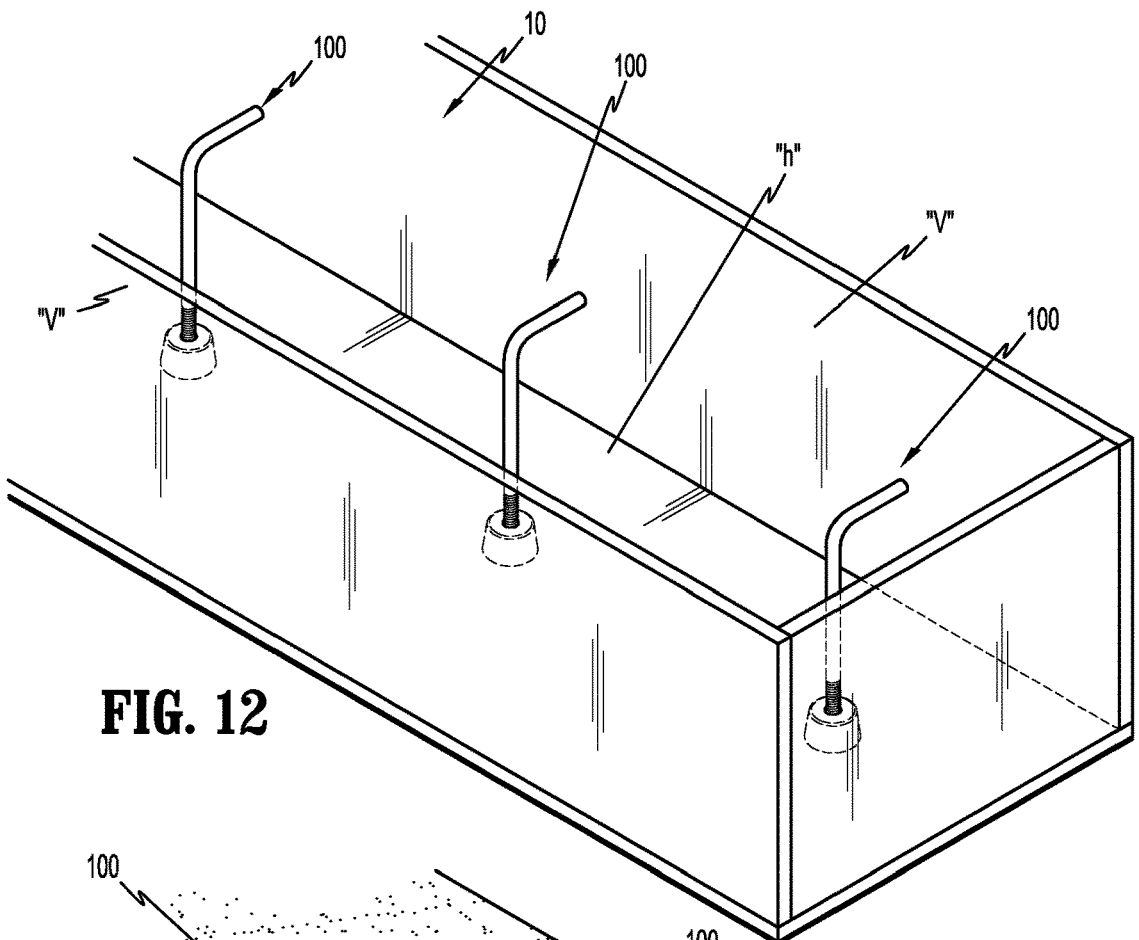
FIG. 12 is a perspective view illustrating a plurality of anchor apparatuses of the anchoring system secured to the form board of the concrete form in accordance with one exemplary methodology of use of the system.
Figure 13:
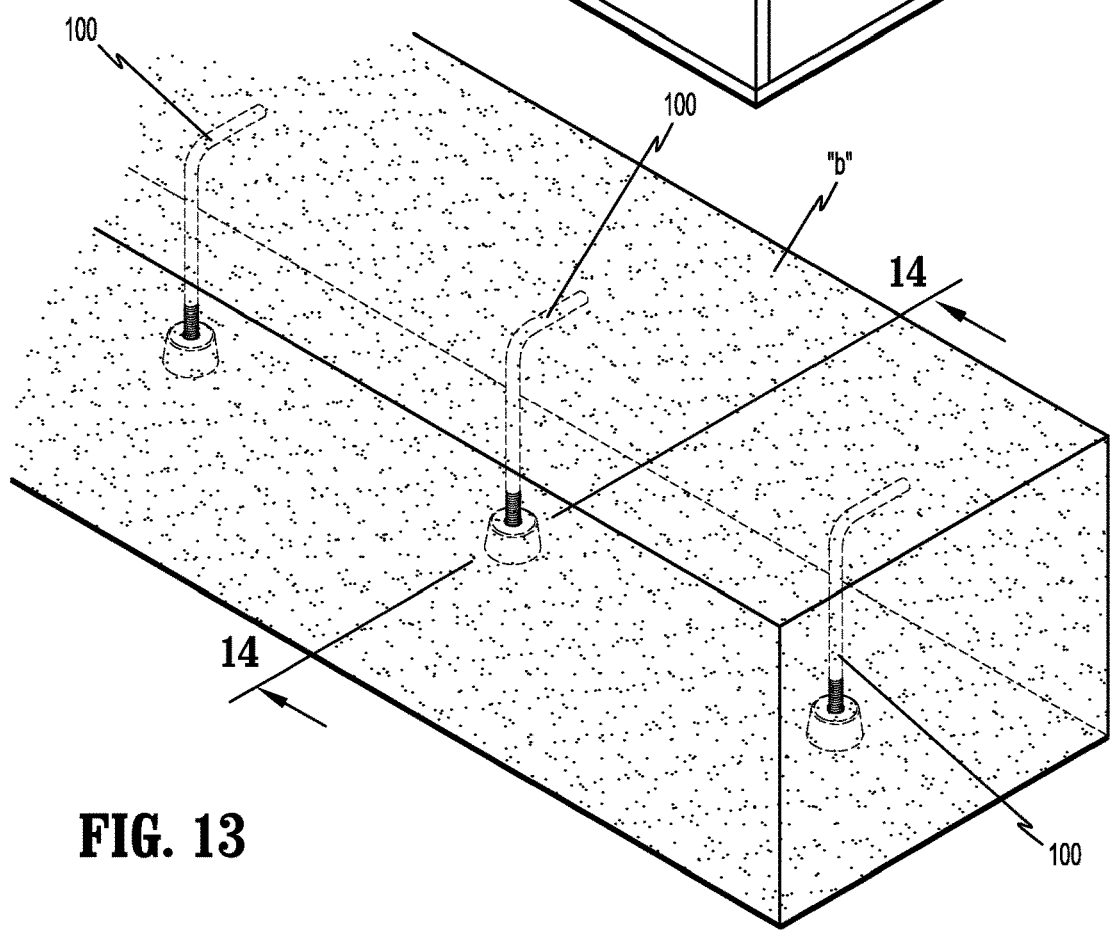
FIG. 13 is a view similar to the view of FIG. 12 illustrating concrete deposited in the concrete form with the anchor apparatuses embedded within the concrete in accordance with one exemplary methodology of use of the system.

Referring now to FIG. 12, a plurality of anchor apparatuses 100 as part of the anchoring system 10 is installed to the horizontal form board "h" at predetermined locations as selected by the contractor. As noted above, these locations preferably correspond to the locations where the equipment, e.g., electrical lines, plumbing, safety cables, safety hooks etc. are to "run" or to be positioned in the structure. In FIG. 12, the concrete form "m" is shown with the vertical form boards "v" and the horizontal form board "h", and further illustrates the anchor apparatuses 100 disposed within the interior of the concrete form "m" FIG. 13 illustrates the horizontal beam "b" formed upon curing of the concrete and depicts in phantom the anchor apparatuses 100 permanently embedded within the horizontal beam "b". In FIG. 13, the horizontal and vertical form boards "h", "v" are removed.

The locking plate 104 and the coupler 106 are removed relative to the external thread 114 of the anchor rod 112. The locking plate 104 and the coupler 106 may be removed simply by rotating the coupler 106 and the locking plate 104 simultaneously until the internal coupler thread 136 of the coupler 106 disengages from the external thread 114 of the anchor rod 112. (See, e.g., FIG. 9A). Alternatively, the locking plate 104 can be disengaged from the coupler 106 by rotating the locking plate 104 to align the keyed slots 122 of the locking plate 104 with the wings 138 of the coupler 106 (FIG. 8A), and then unscrewing the coupler 106 from the external thread 114 of the anchor rod 11.

Figure 15:
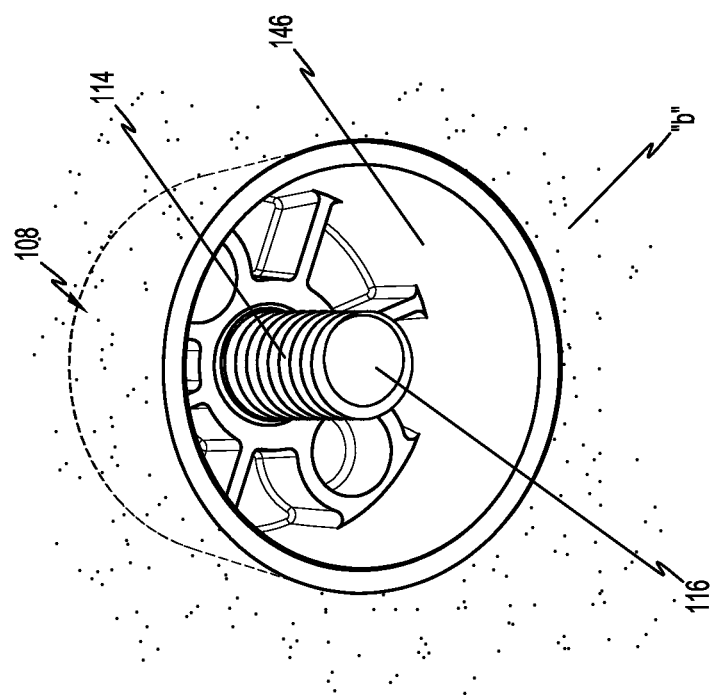
FIG. 15 is a perspective view further illustrating the cover and the external thread exposed upon removal of the form board from the concrete structure in accordance with one exemplary methodology of use of the system.
Figure 14:
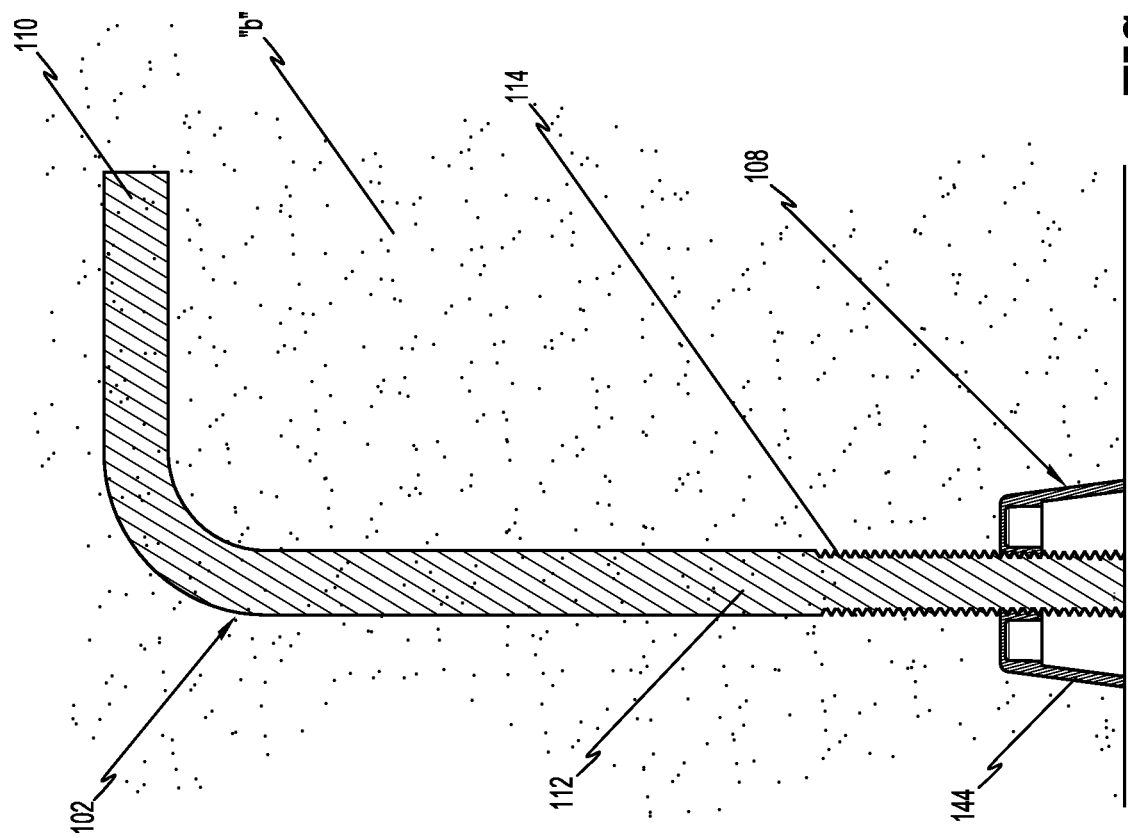
FIG. 14 is a cross-sectional view illustrating one anchor apparatus embedded within the concrete structure with the cover and the external thread of the elongate anchor exposed upon removal of the form board in accordance with one exemplary methodology of use of the system.

With reference to FIGS. 14 and 15, upon removal of the form boards "h", "v", the locking plate 104 and the coupler 106, the cover 108 remains within the horizontal beam "b". As mentioned, the cover 108 prevents ingress of concrete within its internal cavity 146 during curing of the cement thereby forming an accessible cavity in the horizontal beam "b" through which the end portion of the external thread 114 of the anchor rod 112 extends. Specifically, the external thread 114 is accessible to be coupled to an additional coupling tool, construction tool, mount, safety hook, safety cable or the like. In some embodiments, the cover 108 may be removed or pried from the horizontal beam "b" if desired. FIG. 16 illustrates an internal threaded coupling tool 200 being engaged with the external thread 114 of the anchor 102 and a support or safety hook 300 being threadably engaged with the coupling tool 200. FIGS. 17-18 illustrate the coupling tool 200 and the hook 300 secured relative to the anchor apparatus(es) 100. As shown in FIG. 17, a plurality of anchors 102 and hooks 300 may be secured along the horizontal support beam "b" to support materials, supplies, or safety equipment (e.g., perimeter cable) each identified schematically as reference numeral 400, which, again, is inclusive of electrical lines, plumbing, sprinklers, ductwork, safety cable, safety hooks or netting etc. It is also envisioned that separate rows of anchors 102 may be positioned for utilization by different construction personnel, e.g., row "r1" of the anchor apparatuses 100 may be used by the electrician, row "r2" of the anchor apparatuses 100 may be used by the plumber, etc. It is also further envisioned that the covers 108 could be color-coded, e.g., red covers to be used by the electrician, blue covers by the plumber, orange covers for HVAC personnel, etc. This also enhances usability and the organizational capabilities of the anchoring system.

Although the illustrative embodiments of the present disclosure have been described herein with reference to the accompanying drawings, the above description, disclosure, and figures should not be construed as limiting, but merely as exemplifications of particular embodiments. It is to be understood, therefore, that the disclosure is not limited to those precise embodiments, and that various other changes and modifications may be effected therein by one skilled in the art without departing from the scope or spirit of the disclosure. For example, although threaded couplings are illustrated for connecting or coupling some of the components, it is envisioned that any corresponding structure may be substituted such as bayonet couplings, snap fits, tongue-groove arrangements etc.

What is claimed is:

1. An anchoring system, which comprises:
at least one anchoring apparatus, including:
a locking plate configured for securement relative to a form board used to form a concrete support;
an elongate anchor including a connector segment at one end for connecting with a construction tool; and
a coupler mounted to the elongate anchor;
wherein one of the locking plate and the coupler defines an aperture and a keyed slot adjacent the aperture;
wherein the other of the locking plate and the coupler defines a main segment and a wing segment depending from the main segment;
wherein the main segment and the wing segment are respectively positioned into the aperture and the keyed slot when in a first rotational orientation of the coupler and the locking plate; and
wherein relative rotational movement of the coupler and the locking plate to a second rotational orientation thereof secures the coupler and the elongate anchor to the locking plate.

2. The anchoring system according to claim 1 wherein the coupler defines a central opening configured to at least partially receive the connector segment of the elongate anchor, and wherein the coupler and the connecting segment include cooperating structure to releasably secure the coupler and the elongate anchor.

3. The anchoring system according to claim 2 wherein the coupler defines an internal thread at least partially circumscribing the opening and wherein the connector segment of the anchor includes an external thread configured to threadably engage with the internal thread of the coupler to releasably secure the coupler and the elongate anchor.

4. The anchoring system according to claim 1 wherein the coupler is an individual component separate from the elongate anchor, the cover and the elongate anchor including cooperating structure to releasably secure the coupler to the elongate anchor.

5. The anchoring system according to claim 1 wherein the locking plate includes the aperture and the keyed slot, and wherein the coupler includes the main segment and the wing segment.

6. The anchoring system according to claim 5 wherein the locking plate defines two opposed keyed slots and wherein the coupler includes two opposed wings correspondingly dimensioned to be received within the two opposed keyed slots when in the first rotational orientation of the coupler and the locking plate.

7. The anchoring system according to claim 1 including a cover, the cover including an outer wall defining an internal cavity and defining a cover passage for reception of the elongate anchor, the cover movable along the elongate anchor for positioning over the coupler and the locking plate to enclose the coupler and the locking plate within the internal cavity.

8. The anchoring system according to claim 4 wherein the cover defines an inner thread circumscribing the cover passage, the inner thread configured to cooperate with the external thread of the elongate anchor to advance the cover relative to the elongate anchor.

9. The anchoring system according to claim 1 wherein the locking plate includes at least one fastener opening and further including:
at least one fastener advanceable within the at least one fastener opening for securing the locking plate to the form board.

10. The anchoring system according to claim 1 including a construction tool for mounting to the connector segment of the elongate anchor, the construction tool and the connector segment including cooperating structure to secure the construction tool to the connector segment.

11. The anchoring system according to claim 10 wherein the connector segment of the elongate anchor and the construction tool including cooperating threads to mount the construction tool to the connector segment of the elongate anchor.

12. The anchoring apparatus of claim 7 wherein the outer wall of the cover is dimensioned to form a tight tolerance relative to an outer wall of the locking plate to establish a fluid tight fit or seal with the outer wall of the locking plate.

13. The anchoring system according to claim 1 wherein the coupler and the elongate anchor including cooperating threads to mount the coupler to the elongate anchor.

14. An anchoring system for installation in a concrete support, which comprises:
at least one anchoring apparatus, including:
a locking plate configured for securement relative to a form board used to form a concrete support;
an elongate anchor including a connector segment at one end for connecting with a construction tool;
a coupler mounted to the elongate anchor, the coupler manipulable to be coupled to the locking plate to at least partially secure the elongate anchor to the locking plate; and
a cover mounted about the elongate anchor and movable for positioning over the coupler and the locking plate;
wherein the coupler defines a central opening configured to at least partially receive the connector segment of the elongate anchor, and wherein the coupler and the connecting segment include cooperating structure to releasably secure the coupler and the elongate anchor:
wherein the coupler defines an internal thread at least partially circumscribing the opening and wherein the connector segment of the anchor includes an external thread configured to threadably engage with the internal thread of the couple to releasably secure the coupler and the elongate anchor;
wherein the locking plate and the coupler include cooperating structure configured to secure the coupler to the locking plate;
wherein the locking plate defines a plate aperture and at least one keyed slot adjacent the plate aperture; and
wherein the coupler includes a central segment defining the coupler opening and at least one wing depending from the central segment, the central segment and the at least one wing respectively receivable within the plate aperture and the at least one keyed slot of the locking plate when in a first rotational orientation of the coupler and the locking plate, wherein relative rotational movement of the coupler and the locking plate to a second rotational orientation thereof at least partially secures the coupler to the locking plate.

15. The anchoring system according to claim 14 wherein the locking plate defines two opposed keyed slots and wherein the coupler includes two opposed wings correspondingly dimensioned to be received within the two opposed keyed slots when in the first rotational orientation of the coupler and the locking plate.

16. The anchoring system according to claim 15 wherein the cover defines a cover passage for reception of the elongate anchor.

17. The anchoring system according to claim 16 wherein the cover defines an inner thread circumscribing the cover passage, the inner thread configured to cooperate with the external thread of the elongate anchor to advance the cover relative to the elongate anchor.

18. The anchoring system according to claim 17 wherein the locking plate includes at least one fastener opening configured to receive a fastener for securing the locking plate to the form board.

19. The anchoring system according to claim 18 including a plurality of anchor apparatuses.

* * * * *